Inventor
Gaetan De Coye De Castelet
By: Stevens, Davis, Miller & Mosher
Attorneys

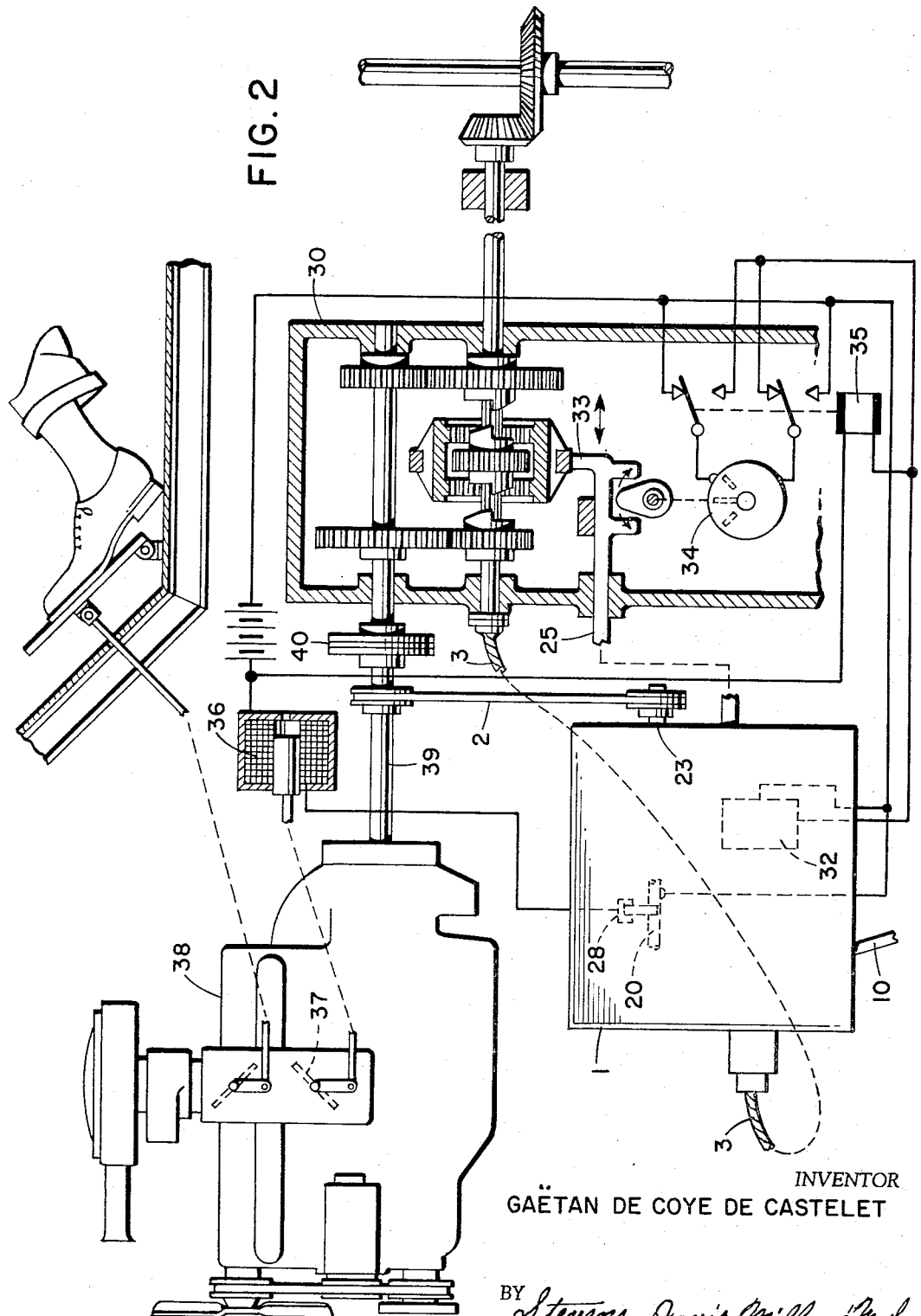

United States Patent Office 3,364,795
Patented Jan. 23, 1968

3,364,795
EDDY CURRENT-TYPE DEVICES FOR AUTOMATICALLY CONTROLLING GEAR CHANGES ON VEHICLES
Gaëtan de Coye de Castelet, Billancourt, France, assignor to Regie Nationale des Usines Renault, Hauts-de-Seine, France
Filed Mar. 12, 1965, Ser. No. 439,285
Claims priority, application France, Mar. 27, 1964, 969,076, Patent 1,418,814
8 Claims. (Cl. 74—858)

ABSTRACT OF THE DISCLOSURE

A device utilizing magnets and eddy currents for controlling gear changes in automatic transmission systems as a function of the speed of the vehicle and/or for comparing the speed of the vehicle engine with that of a shaft coupled to the drive wheels in which the position of magnets, relative to a massive conductor wherein the eddy currents are generated by the magnet, is modified as a function of an auxiliary parameter.

---

Figure 1:
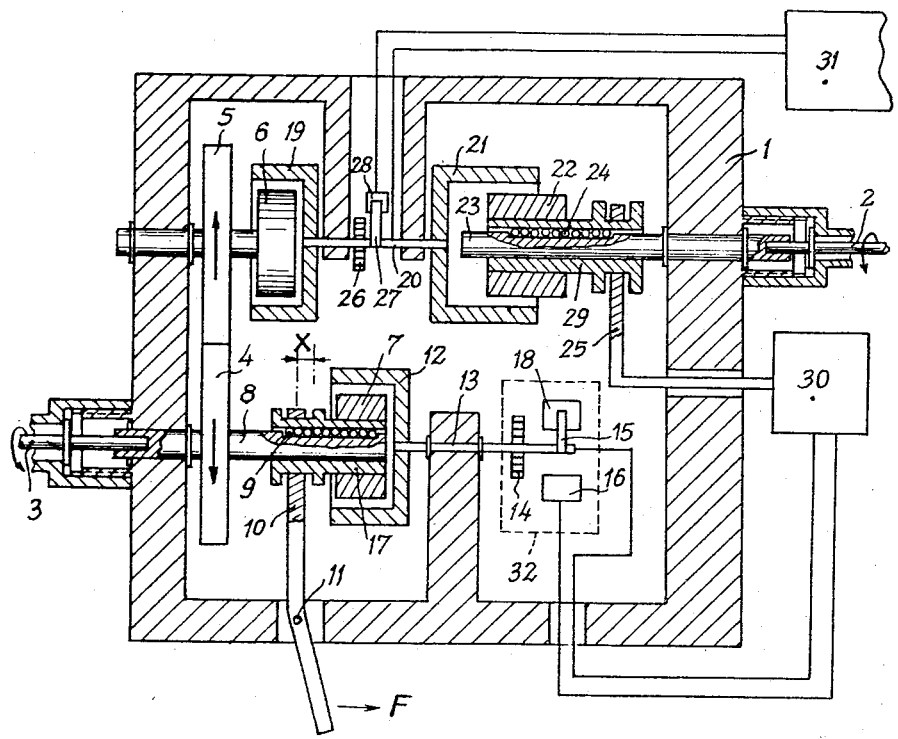

Any proposed solution to the problem of automatically controlling stepwise gear changes on motor vehicles implies the performance of two functions: firstly, control proper of the gear changes (inclding detection of the conditions therefor, emission of the execution command, and the execution itself), and, secondly, synchronizing the various transmission components (gearbox shafts, clutch plate, etc.) and controlling the engine power and speed during and after the actual gear changes.

It is already known to perform the first function by means of a device (similar to certain speed indicators) comprising a magnet rotating at a speed proportional to that of the wheels and generating eddy currents in a metallic bell.

In such systems, the engine "load" factor (of which one possible precise interpretation could be, say, the degree to which thet accelerator pedal is pressed) is introduced in the form of a variation in the tension of one or more opposing springs acting upon the bell, which is then able to rotate coaxially with the rotating magnet through an angle producing equilibrium between the moment exerted by the eddy currents and the opposing moment exerted by the countering springs. In the course of this rotation, the bell actuates a gear change command-emitting element such as, for example, a blade which establishes electrical contact responsively to a given rotation angle of the bell corresponding to a given gear ratio change.

There are as many such contacts as there are gear changes to be controlled by such a command emitter, of which a variety of known constructional form also exist.

In such a device, the difference between the speeds coersponding to upward and downward changes made between two given gear ratios is obtained through the agency of a constant auxiliary torque, so that the absolute value of this speed differential is constant and independent of the speed at which the gear change is made. This is detrimental to stable gear changes, especially at high speeds, when the relative value of the speed differential becomes too small.

It is a first object of the present invention to overcome this drawback and to accordingly provide a gear change governor device in which the axial distance between the rotating magnet and its bell is variable and made dependent upon the degree to which the accelerator pedal is depressed.

With such an arrangement, the different between speeds at which upward and downward changes between two gear ratios are made, for a given value of the "load" parameter, is caused to be proportional to the speed at which the gear change is made. This moreover greatly improves the stability of gear changes.

As regards the second function hereinbefore referred to, to wit that of synchronizing the various gearbox and power control components, on the one hand, and the engine speed, on the other, during and subsequent to gear changes, it can readily be performed by comparing the speed of a gearbox output shaft connected to the vehicle wheels with the engine speed. Such an arrangement further permits engaging the clutch for assisting downward gear changes.

But since the engine speed does not retain the same proportionality constant to the gearbox output shaft speed, it is necessary, in order to solve the problem along the lines indicated, to apply a corrective effect to the gear changes.

A second object of the present invention is accordingly to provide a comparator device of the type hereinbefore described, in which, for each gear change, correction therefor is effected by suitably varying the axial distance between one of the two magnets and its bell. Such variations, which are controlled by the governor referred to, during gear changes, can clearly be obtained by a movement of the magnet alone, its bell remaining stationary, or vice versa.

As will readily be appreciated, the two objects of the present invention are carried into practice in the same automatic control means of stepwise gear changes, and are both based on the same method of introducing an auxiliary parameter into an eddy current-type device, to wit an axial shifting of the magnet relatively to its bell.

The means for accomplishing the foregoing objects and other advantages, which will be apparent to those skilled in the art, are set forth in the following specification and claims and are illustrated in the accompanying drawings dealing with a nonlimitative exemplary embodiment of the present invention. Reference is made now to the drawings in which:

FIG. 1 is a schematic view, partially in section, of the inventive gear change device including a governor and associated synchronizing means; and FIG. 2 is a schematic diagram showing the inventive device in its environment connected to the engine and the gear box.

Referring to FIG. 1, the device shown thereon includes a housing 1 containing in its lower part a gear ratio governor and in its upper part a synchronizing device.

The gear ratio governor comprises, firstly, a unit for detecting the conditions required for a gear change, which unit consists of a magnet 7 integral with a sleeve 17 slidably mounted on a shaft 8 which is driven at a speed proportional to that of the vehicle wheels by a flexible drive 3.

The sliding motion of the sleeve 17 over the shaft 8 is guided by balls 9 lodging in longitudinal grooves formed on these two components, the balls acting as keying means.

Coaxially with the magnet 7, a metal bell 12 is mounted on a shaft 13.

Said governor comprises, secondly, a gear change command-emitting member 32 consisting of a plurality of elements such as those shown as being contained within the housing 1 (and which apply to a specific gear change), to wit a spiral spring 14 secured to the housing and to the shaft 13, a pivoting electric contact arm 15 made of magnetic material and mounted on the shaft 13, a fixed contact 16 associated to a magnet which produces a degree of dwell by the arm 15 when the same is applied against said fixed contact, and a resting stop 18 for the arm 15. The arm 15 and the fixed contact 16 are connected through electrical leads to electromechanical or electronic means for controlling the gearbox 30 and the engine.

Further, the axial position of the magnet-bearing sleeve 17 of the detecting member is controlled by the accelerator pedal (not shown) through a lever 10 pivoting about a pin 11, in such manner that depression of this pedal causes said lever to move in the direction of the arrow F and amplify the parameter X measuring the axial distance of the magnet 7 from its bell 12.

With the engine running and the vehicle traveling in a given gear ratio, the magnet 7 will be rotating at a speed proportional to that of the wheels and will induce eddy currents in the bell 12 that will develop a torque tending to rotate the bell against the opposing torque exerted by the spring 14.

For a given degree of depression of the accelerator pedal (corresponding to a given value of the parameter X), the bell 12 will rotate through a determined angle, whereby the torque developed by the bell 12 will balance the torque exerted by the spring 14. The arm 15 will then lift off its resting stop 18 but will not yet reach the fixed contact 16. If, for the same degree of pedal depression, the speed of the vehicle increases, the torque tending to rotate the bell 12 will also increase and the arm 15 will move closer to the contact 16.

When the time has come to change to the higher gear, the arm 15 touches the contact 16 and dwells thereon, as a result of which the command for a change to the higher ratio is transmitted to the gearbox 30. If the speed of the vehicle were to continue to increase, the contacts 15–16 would remain closed, but a further pair of contacts (not shown) would approach their state of closure in response to a fresh increase in the speed of the vehicle.

For a change to a higher gear ratio, all the already-closed contacts of the command emitter member 32 remain closed, and a fresh pair of contacts close in turn. Thus there is a process of cumulative closure of a sequence of contacts, of which a variety of forms of execution are already known in the prior art.

Clearly, downward gear changes will be produced at lower vehicle speeds than those for upward gear changes (for a given value of X) due to the dwelling effect produced by the magnet and fixed contact 16.

For a different value of X, a higher value for instance (the accelerator being depressed to a greater extent), the driving torque on the bell will be lower for a given vehicle speed, so that a higher magnet speed (i.e. vehicle speed) will be required to produce the same gear change, since such a change is contingent upon the overcoming of an invariably constant opposing torque constituted by the combination of the return springs such as 14 contained in the command emitter member 32.

In substance, it may be said that a shifting of the magnet 7 (or an increase in the parameter X) causes an amplification of all the speeds required for exertion of the opposing torque offered by the command emitter member 32. Since the auxiliary differentiating torque introduced by the magnet and fixed contact 16 forms part of the torques acting on the bell, it is manifest that the difference between the speeds at which an upward and a downward gear change are made will also be amplified in the same ratio, so that the relative difference in speed will be substantially the same for gear changes made at all vehicle speeds, which is an important requirement for stable gear changes.

Considering next the member for comparing the engine speed with the gearbox speed (which forms part of the unit according to this invention), said member consists of two magnets 6 and 22 rotating in opposite directions about the same axis, the magnet 6 being driven by the shaft 8 (at a speed equal or proportional to the gearbox output speed) through a gear coupling 4, 5, and the magnet 22 being driven at a speed equal or proportional to that of the engine by a flexible drive 2.

The magnet 6 rotates in a bell 19, at a fixed distance therefrom. The magnet 22 rotates in a bell 21, at an axial distance therefrom which can be modified as a function of the gear ratio engaged, by means of a lever 25 actuated by the gearbox 30 and operatively connected to a sliding sleeve 29 into which the magnet 22 is fixedly mounted. The sleeve 29 is mounted on a shaft 23 which is rotated by the flexible drive 2 through a keying system utilizing balls 24 which permit smooth unrestrained sliding of the sleeve 29 on the shaft 23.

The two bells 19 and 21 are joined by a common shaft 20 to which is fixed a contact arm 27 adapted to bear against a fixed contact 28. A spiral spring 26 maintains the shaft 20 in a mean position in the absence of any torque exerted by the bells. The arm 27 and the fixed contact 28 are connected by electrical leads to an engine speed-up control member 31 and/or a clutch control member. These control members may be of any well-known electromechanical or electronic type.

When the governor orders a gear change, the clutch plates are mutually disengaged and the engine can then be decelerated for an upward gear change or accelerated for a downward gear change responsively to the contacts 27/28 with, if desired, a re-engagement of the clutch in order to facilitate operation of the gearbox synchronizer ring if such is provided.

The action exerted by the comparator device is not necessarily restricted to the gear-changing periods proper, but can advantageously be extended to the clutch engaging and disengaging periods, as disclosed in applicant's co-pending U.S. application Ser. No. 437,655 filed Mar. 8, 1965, now Patent No. 3,335,830, and based on a corresponding French application filed by the applicant on Mar. 11, 1964. During these periods, if the engine is running too fast, then it is the bell 21 that becomes predominant, causing the arm 27 to move away from its fixed contact 28 and causing a deceleration of the engine.

If the engine is running too slow, then it is the bell 19 that becomes predominant, whereupon the arm 27 rotates in the opposite direction and establishes contact with 28, causing the engine to speed up.

Once synchronization has been established, the permission command for clutch engagement is emitted by any convenient known means (likewise not described in the present specification).

For a fresh gear change, the lever 25 actuated by the gearbox 30 will modify the axial distance between the magnet 22 and its bell whereby to compensate for the proportionality error introduced by the new gear ratio between the rotation speeds of the magnet 6 and the driven clutch-plate.

FIG. 2 shows schematically the connection between the magnetic support lever 25 and the gear box 30. The fork 33 of the gear box is displaced by a known remote control device comprising an electric motor 34 with an end-of-the-stroke contact incorporated therein. The motor 34 receives its orders for rotation to the left or right from a relay 35 whose coil is controlled by contacts 15 and 16 which give the speed change orders. The remote control of the fork 33 by an assembly including an electric motor, cam means, and relay means, is well known.

The increase and decrease of the speed of the engine under the action of the contacts 20 and 28 can be obtained in a known manner by the electromagnet 36 acting on an auxiliary butterfly valve 37 located at the intake conduit of the engine 38 of the vehicle. The output shaft 39 of the engine is connected to the shaft 23 of the invention via flexible cable 2. The clutch 40 is of any known type.

An exemplary auxiliary butterfly control valve for the gas and gearbox fork control has been described in particular in U.S. application Ser. No. 340,393 filed Jan. 27, 1964 by Lucien Peras and assigned to the common assignee.

What is claimed is:

1. A device utilizing magnets and eddy currents for controlling gear changes in automatic transmission systems selectively as a function of the speed of the vehicle and for comparing the speed of the engine with that of a shaft coupled to the wheels, comprising a first magnet, a massive conductor, means to control the relative position between the first magnet and the massive conductor wherein said eddy currents are generated by said magnet as a function of an auxiliary parameter.

2. A device for controlling gear changes according to claim 1, wherein said auxiliary parameter is determined by the position of the accelerator pedal, which pedal moves said magnet away from said massive conductor when the load on the engine increases.

3. A device according to claim 1 for comparing the speeds of the engine and of a shaft coupled to the wheels, wherein said auxiliary parameter is determined by the position of the means controlling the gearbox selector forks of said transmission, thereby causing the torque exerted by said magnet on said massive conductor to vary with the gear ratio engaged, further comprising at least second and third magnets rotating in opposite directions to exert opposing torques on at least one massive conductor, said second magnet controlled by the engine speed and the third magnet being controlled by the speed of a gearbox output shaft, and electrical contacts being operated when said massive conductor is not in a state of equilibrium, which contacts control the engine output.

4. A device according to claim 2, wherein said magnet slides axially responsive to the vehicle accelerator pedal.

5. A device according to claim 3, wherein said magnet has its speed governed by that of the engine and slides longitudinally of itself to be spaced at maximum distance from said massive conductor when the lowest gear ratio is engaged.

6. A device according to claim 3, further comprising shaft means one end of which is connected to an output shaft of said gearbox, the other end of said shaft means being operatively connected to rotatably drive said first and third magnets.

7. A device according to claim 1 wherein the axially-movable magnets are rendered angularly rigid with their respective shafts by balls movable along grooves formed in said shafts.

8. A device for automatically controlling the stepwise gear changes in motor vehicles including proper control of the gear changes and synchronization of the transmission components and controlling the power and speed of the engine during the actual gear changes, comprising a governor and a synchronizing device, said device being mounted in a housing, said governor comprising a magnet axially displaceably mounted on a first shaft and being rotatable therewith, means to drive said shaft at a speed proportional to the speed of the vehicle wheels, a metal bell mounted on a second shaft coaxial with said first shaft, means responsive to the displacement of an accelerator pedal of the vehicle for moving said magnet on said first shaft with respect to the interior of said bell, spring means connected to said second shaft and tending to oppose the rotation thereof, movable contact means mounted on said second shaft, fixed contact means mounted in the path of movement of said movable contact means, electrical connecting means connecting said contacts to means for controlling the gear box of said vehicle, said synchronizing means comprising second and third magnets respectively mounted on third and fourth rotatable shafts, said second magnets being fixedly mounted on said third shaft for rotation therewith, means for driving said third shaft proportionally with respect to said first shaft, said third magnet being axially displaceably mounted on said fourth shaft and being rotatable therewith, means for driving said fourth shaft with respect to the speed of said engine, second and third bell means mounted coaxially with said third and fourth shafts and integrally connected to each other, spring means tending to restrict the rotation of said bell means, means responsive to a displacement of the gears for controlling the axial displacement of said third magnet, second movable contact means mounted on the means integrally connecting said second and third bells, fixed contact means in the path of said second movable contact means, and electrical connection means connecting said second contact means to an engine speed control member.

References Cited
UNITED STATES PATENTS

| | | | |
|---|---|---|---|
| 2,981,121 | 5/1961 | Peras | 74—365 |
| 3,124,693 | 3/1964 | Peras | 74—365 |
| 3,301,085 | 1/1967 | De Castelet | 74—472 |
| 3,007,066 | 11/1961 | Ponsy | 310—96 |
| 3,167,673 | 1/1965 | Miquel | 310—96 |
| 3,182,778 | 5/1965 | Droschel et al. | 74—472 |

FOREIGN PATENTS

| | | |
|---|---|---|
| 1,020,242 | 11/1957 | Germany. |

DONLEY J. STOCKING, *Primary Examiner.*

DAVID J. WILLIAMOWSKY, *Examiner.*

H. S. LAYTON, *Assistant Examiner.*